United States Patent
Zhu et al.

(10) Patent No.: US 9,367,177 B2
(45) Date of Patent: Jun. 14, 2016

(54) METHOD AND SYSTEM FOR DETERMINING TRUE TOUCH POINTS ON INPUT TOUCH PANEL USING SENSING MODULES

(71) Applicant: Hong Kong Applied Science and Technology Research Institute Company Limited, Hong Kong (HK)

(72) Inventors: Xiuling Zhu, Hong Kong (HK); Xurong Li, Hong Kong (HK); Lichun Ye, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 191 days.

(21) Appl. No.: 13/929,756

(22) Filed: Jun. 27, 2013

(65) Prior Publication Data

US 2015/0002470 A1      Jan. 1, 2015

(51) Int. Cl.
G06F 3/042       (2006.01)

(52) U.S. Cl.
CPC ............ *G06F 3/0428* (2013.01); *G06F 3/0421* (2013.01)

(58) Field of Classification Search
CPC ..... G06F 3/042; G06F 3/0421; G06F 3/0425; G06F 3/0428; G06F 2203/04109
See application file for complete search history.

(56) References Cited

U.S. PATENT DOCUMENTS

| | | | |
|---|---|---|---|
| 7,948,479 B2 | 5/2011 | Liu et al. | |
| 2003/0034439 A1* | 2/2003 | Reime et al. | 250/221 |
| 2006/0232830 A1* | 10/2006 | Kobayashi | 358/448 |
| 2010/0090986 A1* | 4/2010 | Wang | 345/175 |
| 2010/0253637 A1 | 10/2010 | Lieberman et al. | |
| 2010/0309168 A1 | 12/2010 | Huang | |
| 2011/0006981 A1 | 1/2011 | Chtchetinine et al. | |
| 2011/0169727 A1 | 7/2011 | Akitt | |
| 2011/0205189 A1 | 8/2011 | Newton | |

\* cited by examiner

*Primary Examiner* — Ram Mistry
(74) *Attorney, Agent, or Firm* — Ella Cheong Hong Kong; Sam T. Yip (57) ABSTRACT

The present invention is to provide a method and system for determining true touch points on input touch panel. Two optical sensing module pairs are used to determine two groups of possible touch regions, further with overlap checking with virtual shadow regions to find out potential touch points. Occlusion checking is implemented to acquire true touch points from the potential touch points. The method of the present invention is capable of acquiring true touch points in a fast and reliable way. Furthermore, an interactive input system of the present invention comprises optical sensing modules having their corresponding optical emitters with different wavelengths, and light filters with peak transmission at different wavelengths to avoid from interference effect and over-exposed signal during signal detection by the optical sensing modules.

17 Claims, 12 Drawing Sheets

| Potential Touch Points | Shadow Regions |
|---|---|
| P1 | L11, L21, L32, L42 |
| P2 | L12, L21, L32, L41 |
| P3 | L12, L22, L31, L41 |

FIG. 7

| Potential Touch Points | Module 1 (201) | | Module 2 (202) | | Module 3 (203) | | Module 4 (204) | |
|---|---|---|---|---|---|---|---|---|
| | L11 | L12 | L21 | L22 | L31 | L32 | L41 | L42 |
| P1 | Y | N | Y | N | N | Y | N | Y |
| P2 | N | Y | Y | N | N | Y | Y | N |
| P3 | N | Y | N | Y | Y | N | Y | N |

| Potential points | Module 1 | | | Module 2 | | | Module 3 | | |
|---|---|---|---|---|---|---|---|---|---|
| | L11 | L12 | L13 | L21 | L22 | L23 | L31 | L32 | L33 |
| P1 | N | N | Y | Y | N | N | N | Y | N |
| P2 | N | Y | N | N | Y | N | Y | N | N |
| P3 | Y | N | N | N | N | Y | N | N | Y |
| P4 | N | N | Y | N | Y | N | N | N | Y |

METHOD AND SYSTEM FOR DETERMINING TRUE TOUCH POINTS ON INPUT TOUCH PANEL USING SENSING MODULES

FIELD OF THE INVENTION

The present invention relates to a touch detection system associated with touch screen technology, and more particularly, to a method and system for determining true touch points on an input touch panel.

BACKGROUND

With rapid development in image display technology, touch screens that allow data input using direct contact have become common display apparatuses and widely applied to various electronic products.

Nonetheless, most conventional touch screens can only detect a single touch point at a time. Once a user indicates two or more touch points on the touch screen simultaneously, a detection error will occur. Additionally, such conventional touch screens usually have small touch sensing area.

As interactive whiteboard application is getting more popular, there exits a strong need in providing an interactive input system capable of handling multiple inputs and having large touch sensing area. Currently, optical touch detection technology is considered as an effective means for achieving the abovementioned needs.

The optical touch detection technology is based on detection of light traveling in optical paths on or above the touched surface, and uses combinations of optical sensors, optical emitters, digital signal processing, and algorithms to determine a touch point. Generally, two optical assemblies are positioned along edges of a touch sensing area, with their fields of view covering the touch sensing area. The optical sensors are oriented to track any object movement within the touch sensing area by detecting interruptions of light within their fields of view. In most cases, both the optical sensor and optical emitter, such as light emitting diode, are incorporated within one optical assembly.

Some optical touch detection systems further include retro-reflective materials positioned around the touch area for reflecting or guiding light from the optical emitter back toward the optical sensors. It is well known in the art that the retro-reflective materials, mostly mounted on bezel segments, are able to return light in substantially the same direction from where the light is originated.

Once an object interrupts light in the detection plane, the object will cast a shadow on the bezel segment, which is registered as a decrease in retro-reflected light. With this principle, a first optical sensor would register the location of shadow to determine the direction of the first shadow cast on bezel segment. Meanwhile, a second optical sensor would register the location of second shadow cast on the bezel segment within its field of view.

Based on the light interruption, a touch point can be triangulated from the intersection of the two shadow lines. With further calculation, a coordinate of the touch point is determined.

Nevertheless, a problem arises when two or more points are simultaneously touched. For example, two touch points result in four shadows at the edges of touch area, leading to four intersections. Two of them are real touch points, while the other two are considered as the ghost points. With respect to the conventional triangulation algorithms used for calculating touch point coordinates, the ghost points and touch points appear as potential points, which have to be further evaluated to determine which of them are the true touch points.

A conventional way to distinguish between ghost points and true touch points is by increasing the number of optical sensors positioned along the touch area. For example, four optical sensors are used and positioned at four corners of the touch area. Even increasing the number of optical sensors can improve triangulation accuracy, it also increases the number of potential points, which have to be evaluated to obtain the true touch points. For example, when there are two true touch points and four optical sensors, 24 potential points are generated. With four touch points, 96 potential points are generated.

A potential point pair is a pair of two potential points. If the respective potential points within a pair are close together, it is likely that the pair represents a true touch point. Thus, in order to find true touch points, the analysis requires searching all combinations of potential point pairs that are the least apart and selecting true touch points from this set by binning and sorting by frequency.

Assuming with four potential points, there are 6 combinations of potential point pairs that have to be computed for the parting distance between the potential points within each pair. For 96 potential points, there will be 4,560 potential point pairs generated. As described above, once all potential point pairs are identified, the distance between each potential points within each pair is computed, then the computed distances are compared and sorted in order to determine which pairs representing the true touch points. Such analysis is computationally intensive, especially when dealing with many touch points simultaneous.

Apart from the difficulty in elimination of ghost points, once all sensing modules are exposed simultaneously, over-exposed signal and interference effect may appear since light emitted from a sensing module can interfere the signals received by the others.

US2011/0205189A1 discloses a method and system for resolving multi-touch scenarios based on calculating the distance between two potential points obtained from two pairs of optical sensors. However, such computation is inefficient, overly resource and time consuming.

As disclosed in US2011/0169727A1, sensing modules are exposed sequentially by reducing the light intensity emitted by certain sensing module for avoiding generation of potential points and interference effect during signal detection. Nonetheless, if a touch object is moving very fast, the touch object will be captured at different positions, thereby making finding the accurate position of the touch object difficult.

SUMMARY OF THE INVENTION

The present invention is to provide a method and system for determining true touch points on input touch panel.

Accordingly, it is a first aspect of the presently claimed invention to provide a method for determining true touch points on a large size multiple input touch panel using virtual shadow region, which is able to enhance calculation speed and reliability in defining true touch points.

In accordance to an embodiment, the method of the presently claimed invention comprises the steps of exposing optical sensing modules to a touch sensing area simultaneously, determining real shadow regions based on signals detected by the optical sensing modules, calculating a first group of possible touch regions based on the real shadow regions detected by a first sensing module pair through triangulation mapping, calculating a second group of possible touch regions from the real shadow regions detected by a second sensing module pair through triangulation mapping, performing an overlap checking between the first group and the second group of possible touch regions, determining the possible touch regions as potential touch points where having overlapping, and analyzing the potential touch points with occlusion checking to obtain true touch points.

In accordance to various embodiments of the presently claimed invention, the overlap checking with virtual shadow regions between the first group and the second group of possible touch regions is used to obtain true touch points and eliminate ghost points. The overlap checking with virtual shadow regions comprises the steps of determining virtual shadow regions for each optical sensing module by using another possible touch region determined by another sensing module pair, checking overlapping between the real shadow region and the virtual shadow region for each optical sensing module, and determining the possible touch region as a potential touch point where having overlapping.

According to one embodiment of the presently claimed invention, the step of overlap checking between the real shadow region and the virtual shadow region further comprises the steps of determining an angle range of real shadow region defined by an inner angle and outer angle of real shadow region, determining an angle range of virtual shadow region defined by an inner angle and outer angle of virtual shadow region, comparing the angle range of real shadow region with the angle range of virtual shadow region, and determining the real shadow region and the virtual shadow region having overlapping when the angle range of real shadow region is overlapped with the angle range of virtual shadow region.

In accordance to various embodiments of the presently claimed invention, the occlusion checking is to determine whether a potential touch point is a true touch point by examining each shadow region, further with checking whether the potential touch point is a sole point in the shadow region. The occlusion checking comprises the steps of checking the number of potential touch point along all shadow regions, and determining a potential touch point as a true touch point when the potential touch point is sole in the shadow region.

In accordance to another embodiment, the method of the presently claimed invention comprises the steps of exposing optical sensing modules on a touch sensing area simultaneously, determining real shadow regions based on signals detected by the optical sensing modules, calculating a first group of possible touch regions based on the real shadow regions detected by a first sensing module pair through triangulation mapping, calculating a second group of possible touch regions from the real shadow regions detected by a second sensing module pair through triangulation mapping, performing overlap checking with virtual shadow regions between the first group and the second group of possible touch regions, and determining the possible touch regions as touch points where having overlapping.

A second aspect of presently claimed invention is to provide an interactive input system for determining true touch points on a large size multiple input touch panel by implementing with optical emitters with different wavelengths, and corresponding light filters for reducing interference effect and eliminating over-exposed signal during signal detection by optical sensing modules.

In accordance to an embodiment, the interactive input system of the presently claimed invention comprises a touch sensing area, optical sensing modules located around the touch sensing area for forming a sensing zone within the touch sensing area. At least one first optical sensing module, selected from the optical sensing modules, includes a first optical emitter with a first wavelength. At least one second optical sensing module, selected from the optical sensing modules and located at the opposite corner to the first optical sensing module, includes a second optical emitter with a second wavelength. The first and second wavelengths are different.

In accordance to a further embodiment of the presently claimed invention, the first optical sensing module of the interactive input system further includes a first light filter arranged to allow light with the first wavelength to pass through. The second optical sensing module further includes a second light filter arranged to allow light with the second wavelength to pass through.

In accordance to a yet embodiment of the presently claimed invention, the first optical sensing module further includes a second optical emitter with the second wavelength. The second optical sensing module further comprises a first optical emitter with the first wavelength. The first and second optical emitters in the first and/or the second optical sensing modules can be driven with different current.

In accordance with a yet further embodiment of the presently claimed invention, the optical sensing modules further includes a retro-reflector arranged above or below the light filters.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, a method and system for determining true touch points on a large size multiple input touch panel using virtual shadow region according to the presently claimed invention is set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The presently claimed invention provides a method and system for determining true touch points on a large size multiple input touch panel using overlap checking with virtual shadow regions that enhances calculation speed and reliability in finding out true touch points on an interactive touch panel.

Figure 1:
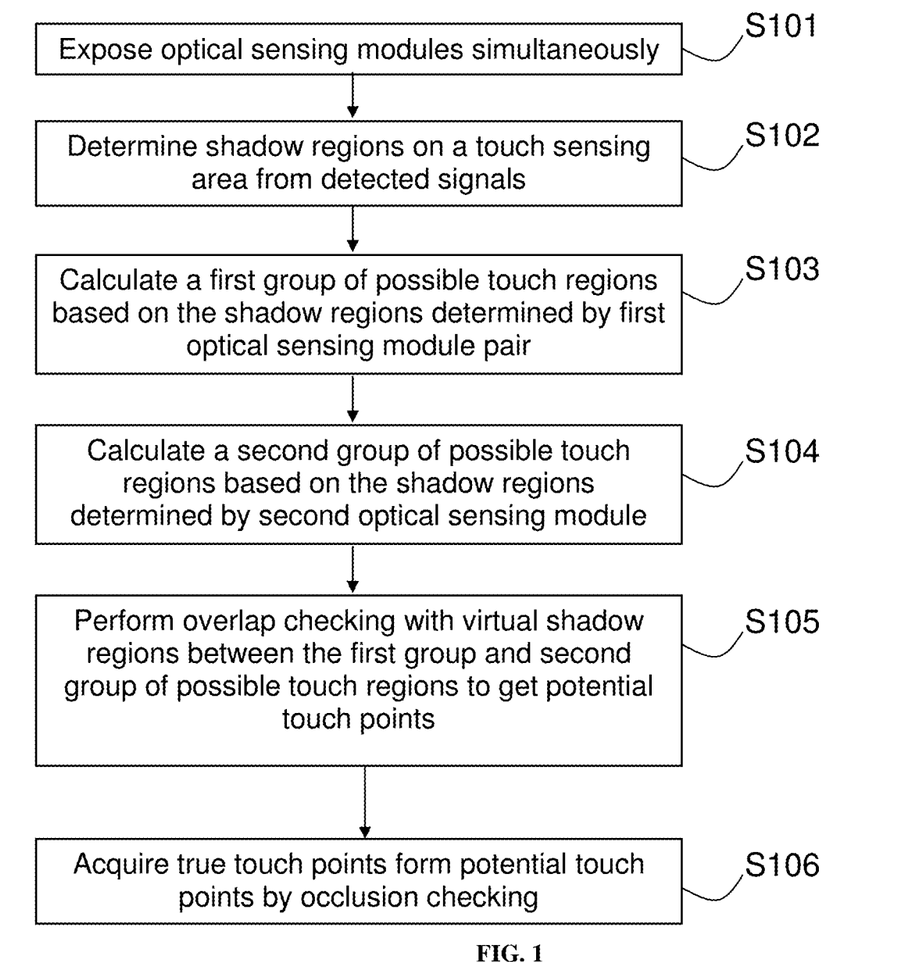
FIG. 1 shows a process flow diagram illustrating the steps of the method for determining true touch points on an input touch panel according to one embodiment of the presently claimed invention.

FIG. 1 shows a process flow diagram illustrating the steps of the method for determining true touch points on a large size multiple input touch panel using virtual shadow region according to one embodiment of the presently claimed invention. In step 101, all optical sensing modules, located around a touch sensing area, are exposed simultaneously. In step 102, shadow regions are determined from signals detected by the optical sensing modules. In step 103, a first group of possible touch regions is calculated through triangulation mapping based on the shadow regions detected by a first optical sensing module pair, selected from the optical sensing modules. In step 104, a second group of possible touch regions is calculated through triangulation mapping based on the shadow regions detected by a second optical sensing module pair, selected from the optical sensing modules through triangulation mapping. In step 105, overlap checking with virtual shadow regions is performed to check for overlapping between the first and the second groups of possible touch regions in order to find out potential touch points. In step 106, true touch points are acquired from the potential touch points after occlusion checking.

Generally, the optical sensing module in the present invention includes optical sensors such as line scan sensors or area image sensors, and optical emitters. Determination of a point on a touch sensing area is relied on detection of light traveling in the optical paths that lie in the detection planes, and any light interruption therein. In many cases, bezels positioned on borders of the touch sensing area include retro-reflective materials for retro-reflecting light from the bezels back towards the optical sensing modules for point detection. Furthermore, overlap checking between the first group and the second group of possible touch regions is mandatory in the present invention but the overlap checking with virtual shadow region between the first group and the second group of possible touch regions is a preferable option.

In one embodiment, at least three optical sensing modules are used in the present invention so as to form a first and second optical sensing module pair. For example, when there are three optical sensing modules A, B and C, the optical sensing modules A and B can form a first optical sensing pair while the optical sensing module B and C can form a second optical sensing pair.

Figure 2A:
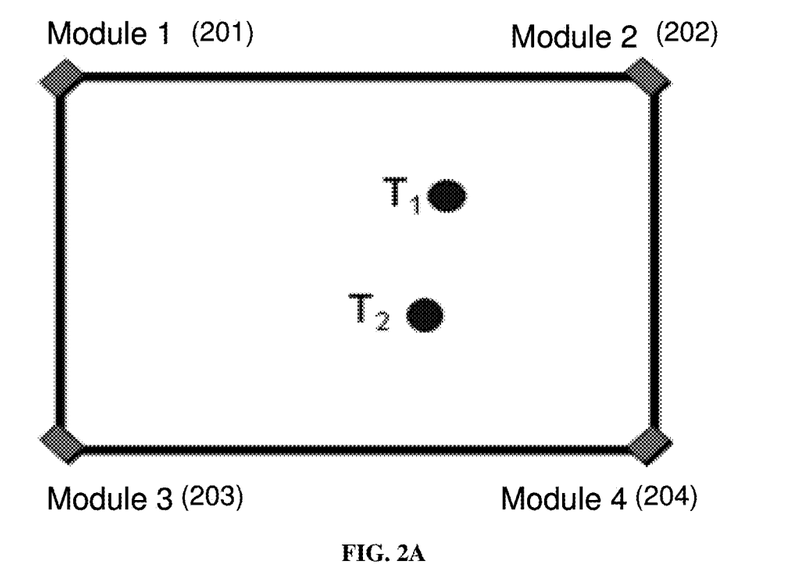
FIG. 2A is a schematic diagram showing two touch points on a touch sensing area, and four optical sensing modules located at the four corners of the touch sensing area according to one embodiment of the presently claimed invention.

An exemplary embodiment according to the presently claimed invention with two true touch points and four optical sensing modules located at four corners of a touch sensing area is used for illustration. As shown in FIG. 2A, there is a rectangular touch sensing area, and four optical sensing modules, indicated as module 1 (201), 2 (202), 3 (203), and 4 (204), located at the four corners of the touch sensing area. Two touch points $T_1$ and $T_2$ are located on the touch sensing area. The module 1 (201), 2 (202), 3 (203) and 4 (204) are able to determine the shadow regions by detecting interruption of light within their fields of view.

Figure 2B:
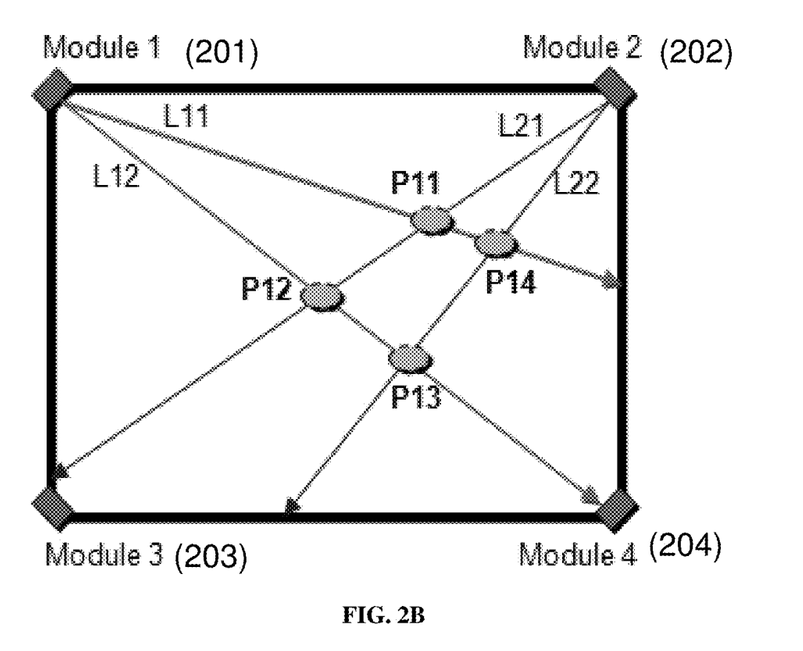
FIG. 2B is a schematic diagram showing a first group of possible touch regions determined by a first optical sensing module pair.

The module 1 (201) and module 2 (202) form a first optical sensing module pair. As shown in FIG. 2B, the module 1 (201) determines two shadow regions L11 and L12 due to light interruption by $T_1$ and $T_2$ respectively, and the module 2 (202) determines other two shadow regions L21 and L22 due to light interruption by $T_1$ and $T_2$ respectively. The shadow regions L11, L12, L21, and L22 determined by the first optical sensing pair are triangulated through triangulation mapping to calculate a first group of possible touch regions including P11, P12, P13, and P14.

Figure 2C:
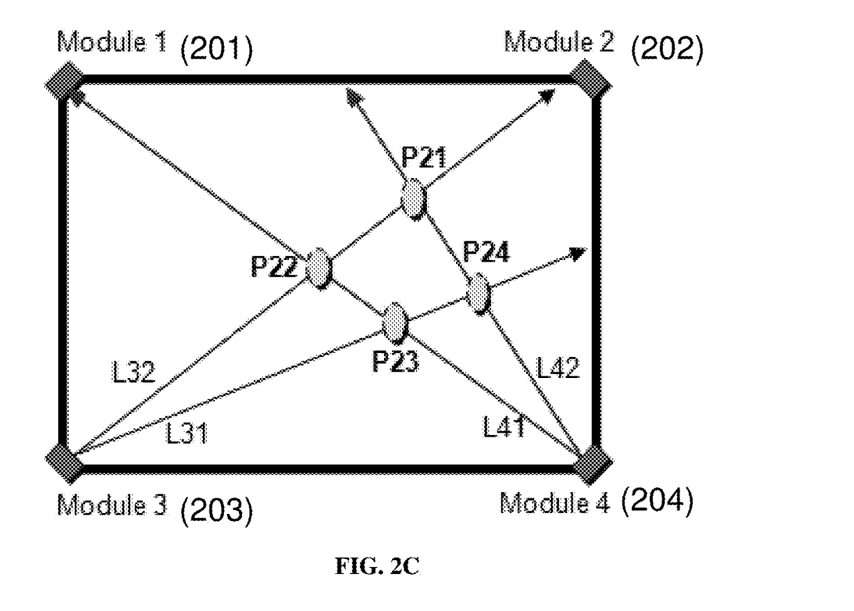
FIG. 2C is a schematic diagram showing a second group of possible touch regions determined by a second optical sensing module pair.

Similarly, the module 3 (203) and module 4 (204) form a second optical sensing module pair. As shown in FIG. 2C, the module 3 (203) determines two shadow regions L31 and L32 due to light interruption by $T_2$ and $T_1$ respectively, and the module 4 (204) determines other two shadow regions L41 and L42 due to light interruption by $T_2$ and $T_1$ respectively. The shadow regions L31, L32, L41, and L42 determined by the second optical sensing pair are triangulated through triangulation mapping to acquire a second group of possible touch regions including P21, P22, P23, and P24.

Figure 2D:
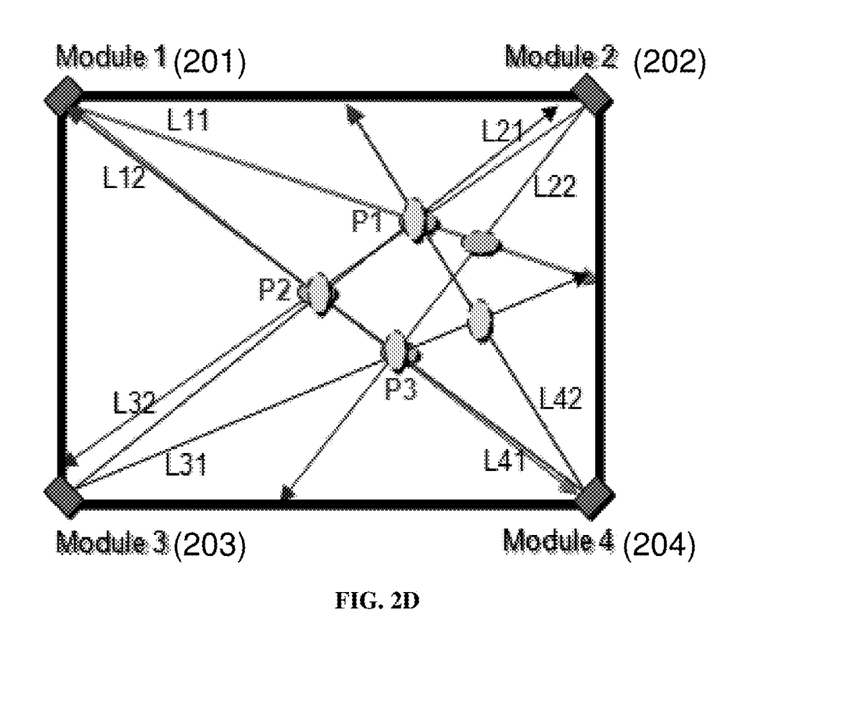
FIG. 2D is a schematic diagram showing three potential touch points on the touch sensing area.

After obtaining the first and the second group of possible touch regions, overlap checking with virtual shadow regions is performed to get potential touch points. As shown in FIG. 2D, P11, P12, and P13 are overlapped with P21, P22, and P23 respectively so three potential touch points including P1, P2, and P3 are obtained. However, P2 is not a true touch point even though there is overlapping between P12 and P22. Hence occlusion checking is performed to eliminate P2 from those potential touch points. Finally, only P1 and P3 are determined as true touch points, which are equivalent to $T_1$ and $T_2$.

Figure 3:
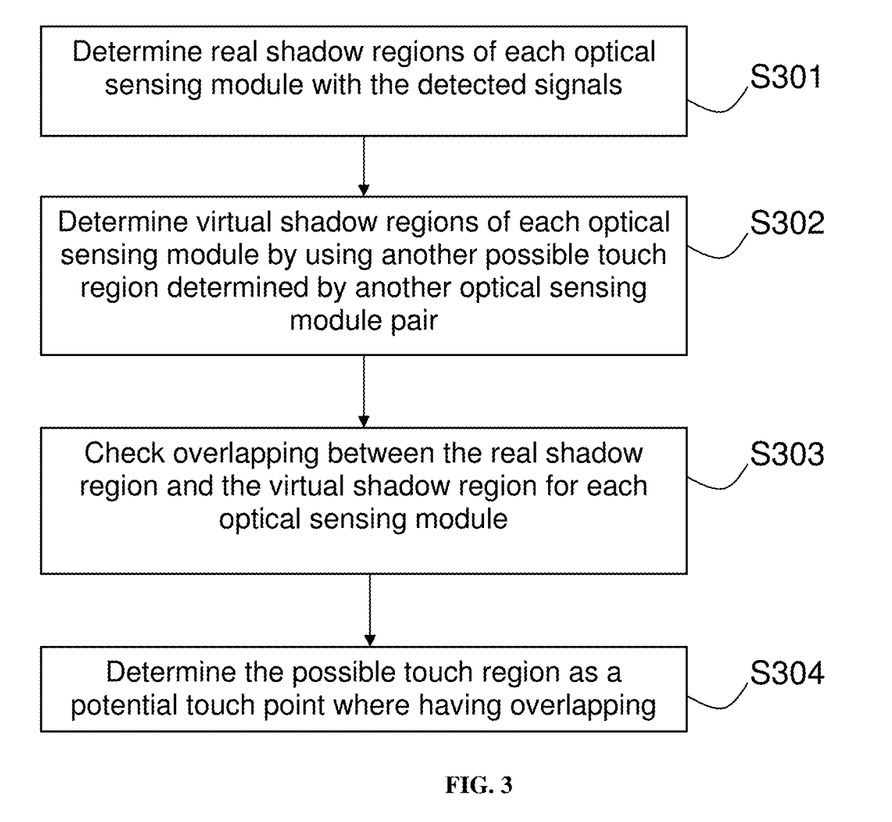
FIG. 3 shows a process flow diagram illustrating the steps of overlap checking with virtual shadow regions according to one embodiment of the presently claimed invention.

FIG. 3 shows a process flow diagram illustrating the overlap checking with virtual shadow regions according to various embodiments of the presently claimed invention. In step 301, real shadow regions for each optical sensing module are determined with the detected signals. The real shadow region is equivalent to the shadow region determined in step 102. In step 302, virtual shadow regions for each optical sensing module are determined by using another possible touch region determined by another optical sensing module pair. In step 303, overlapping between the real shadow region and its corresponding virtual shadow region is checked for each optical sensing module. In step 304, the possible touch region is determined as a potential touch point where having overlapping for all optical sensing modules.

Figure 4:
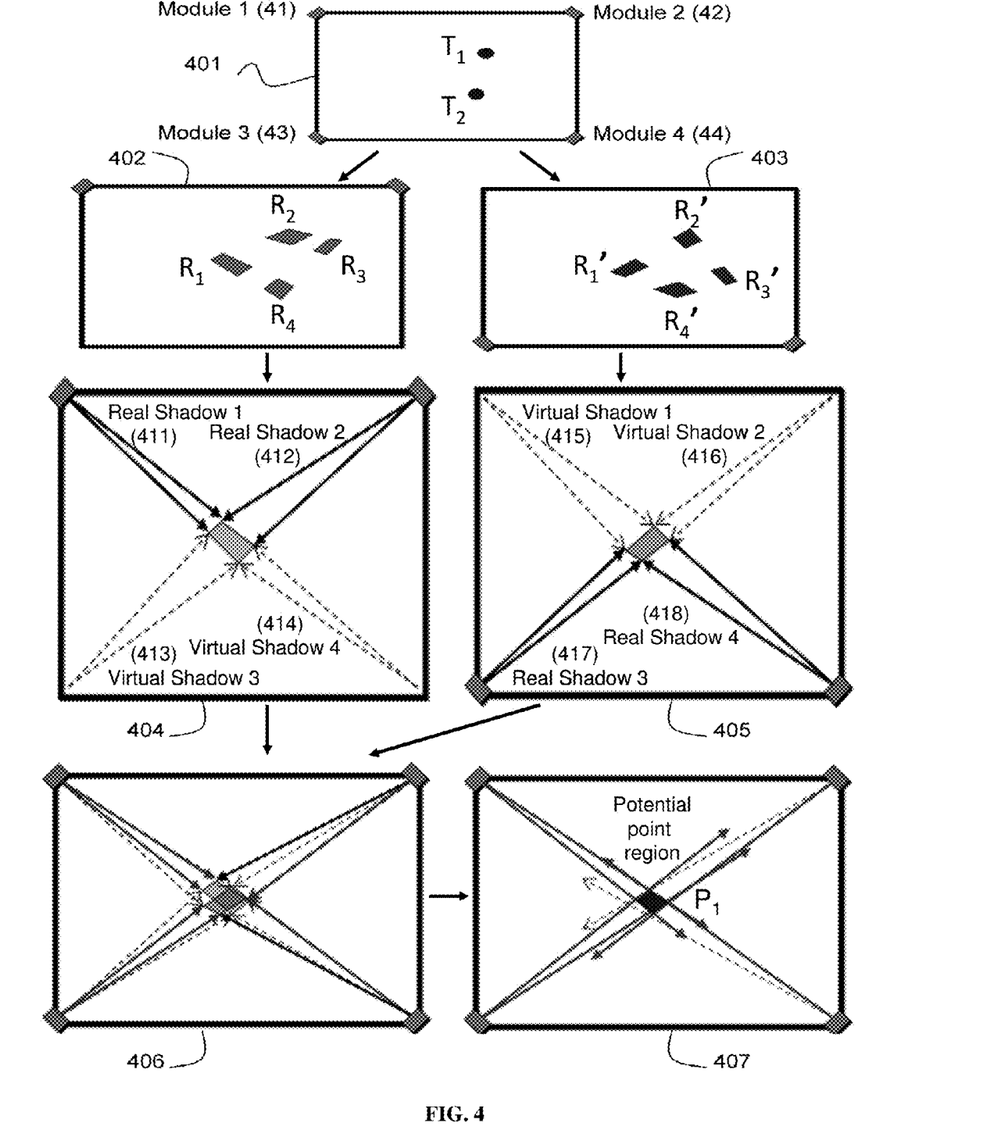
FIG. 4 shows a schematic diagram regarding a process flow of an exemplary overlap checking with virtual shadow regions according to one embodiment of the presently claimed invention.

FIG. 4 shows a schematic diagram regarding a process flow of an exemplary overlap checking with virtual shadow regions according to one embodiment of the presently claimed invention. Box 401 shows two touch points, $T_1$ and $T_2$, on a touch sensing area, and four optical sensing modules, indicated as module 1 (41), 2 (42), 3 (43), and 4 (44), which are located at the four corners of the touch sensing area. Box 402 shows four possible touch regions $R_1$, $R_2$, $R_3$, and $R_4$, defined by the two optical sensing modules at the top, the module 1 (41) and 2 (41). Box 403 shows another four possible touch regions $R_1'$, $R_2'$, $R_3'$, and $R_4'$, defined by the two optical sensing modules in the bottom, the module 3 (43) and 4 (44). Box 404 shows the possible touch region $R_1$ as an example for defining the real and virtual shadow regions including real shadow 1 (411), real shadow 2 (412), virtual shadow 3 (413), and virtual shadow 4 (414) with respect to the module 1 (41), 2 (42), 3 (43), and 4 (44). Box 405 shows the possible touch region $R_1'$ as an example for defining the real and virtual shadow regions including virtual shadow 1 (415), virtual shadow 2 (416), real shadow 3 (417), and real shadow 4 (418) with respect to the module 1 (41), 2 (42), 3 (43), and 4 (44). As shown in box 406, the overlapping between the real shadow region and virtual shadow region for the module 1 (41), 2 (42), 3 (43), and 4 (44) are checked. Box 407 shows an overlapped shadow region between the $R_1$ and $R_1'$, indicated as $P_1$, which is determined as a potential point region.

Figure 5:
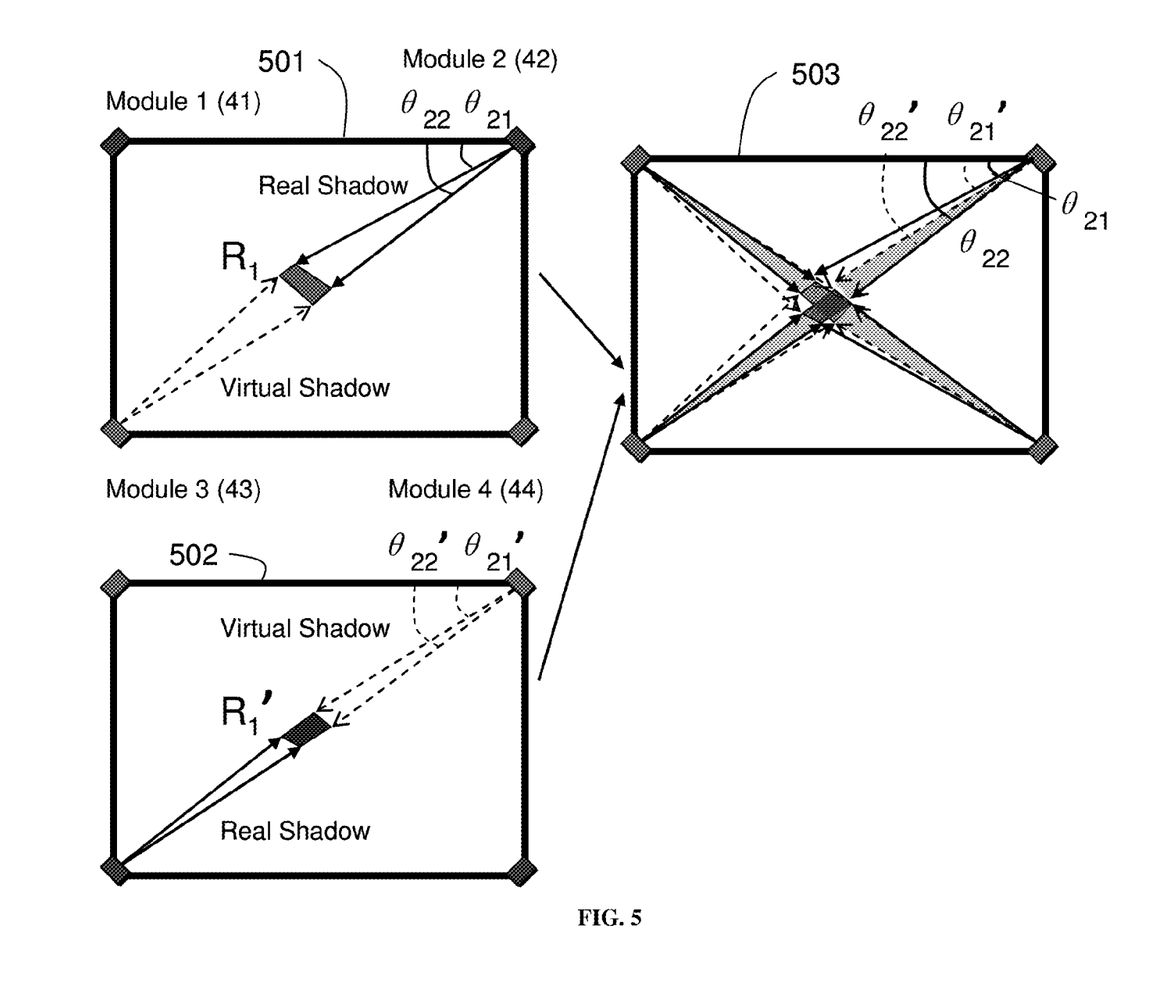
FIG. 5 shows a schematic diagram regarding a process flow of an exemplary overlap checking with virtual shadow regions by comparing angle ranges according to one embodiment of the presently claimed invention.
Figure 6:
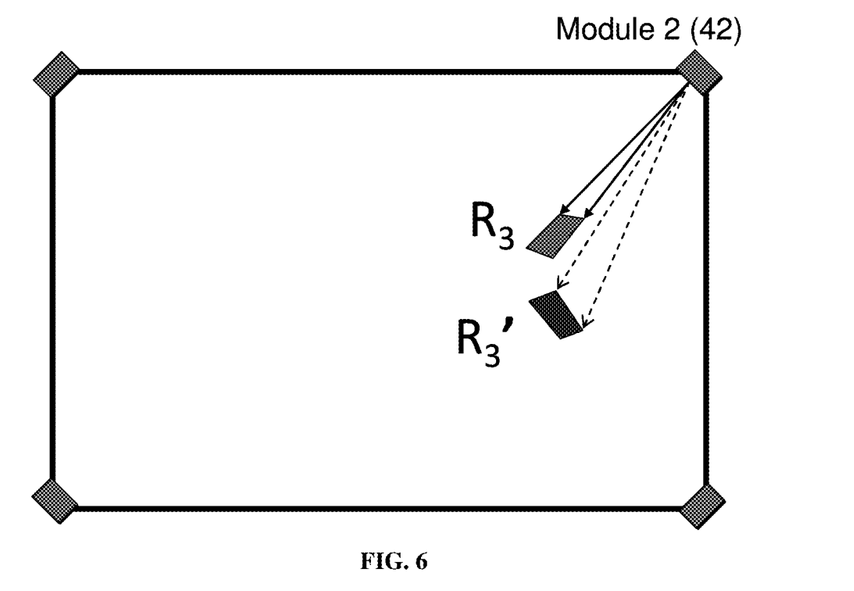
FIG. 6 shows a schematic diagram regarding an exemplary overlap checking with virtual shadow regions by comparing angle ranges according to another embodiment of the presently claimed invention.

According to one embodiment of the presently claimed invention, the overlapping between real shadow region and virtual shadow region can be checked by comparing an angle range of real shadow region with an angle range of virtual shadow region. The overlapping between the $R_1$ and $R_1'$ is used as an example, which is shown in FIG. 5. Box 501 shows an inner angle $\theta_{21}$ and outer angle $\theta_{22}$ of real shadow region of the module 2 (42). Box 502 shows an inner angle $\theta_{21}'$ and outer angle $\theta_{22}'$ of virtual shadow region of the module 2 (42). As shown in box 503, when the angle range of real shadow region, defined by the range of possible angle values between $\theta_{21}$ and $\theta_{22}$, is overlapping the angle range of virtual shadow region, defined by the range of possible angle values between $\theta_{21}'$ and $\theta_{22}'$, it is considered as having overlapping. Once the angle ranges of real shadow of the module 1 (42), 3 (43), and 4 (44) are also overlapped with their corresponding angle ranges of virtual shadow region, the overlapped region between $R_1$ and $R_1'$ is determined as a potential touch point region. Otherwise, as shown in FIG. 6, if there is no overlapping between the angle range of real shadow region and angle range of virtual shadow region such as for the $R_3$ and $R_3'$, these possible touch regions are determined as ghost points.

In summary, checking overlapping between real and virtual shadow regions further comprises the steps of determining an angle range of real shadow region defined by an inner angle and outer angle of real shadow region, determining an angle range of virtual shadow region defined by an inner angle and outer angle of virtual shadow region, comparing the angle range of real shadow region with the angle range of virtual shadow region, and determining the real and virtual shadow regions having overlapping when their angle ranges are overlapped.

However, in some cases, using overlap checking with virtual shadow regions is insufficient to eliminate all ghost points once two ghost points are so close to each others. For example, only two touch points are used while three potential touch points P1, P2 and P3 are obtained in the embodiment shown in FIG. 2A-D. Consequently, for enhancing the reliability in elimination of all ghost points, occlusion checking is implemented. The occlusion checking is used to confirm whether a potential touch point is a true touch point by examining each shadow region to check whether the potential touch point is a sole point in the shadow region.

Figure 7:
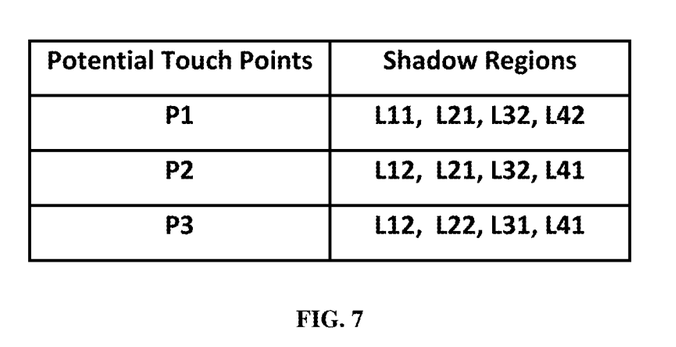
FIG. 7 is a table showing potential touch points laid on their corresponding shadow regions according to one embodiment of the presently claimed invention.

Referring back to the embodiment shown in FIG. 2A-D, there are three potential touch points P1, P2, and P3, which are detected by their corresponding shadow regions as shown in the table of FIG. 7. For example, the potential touch point P1 is laid on the shadow regions L11, L21, L32, and L42 with respect to the module 1 (201), 2 (202), 3 (203), and 4 (204).

Figure 8:
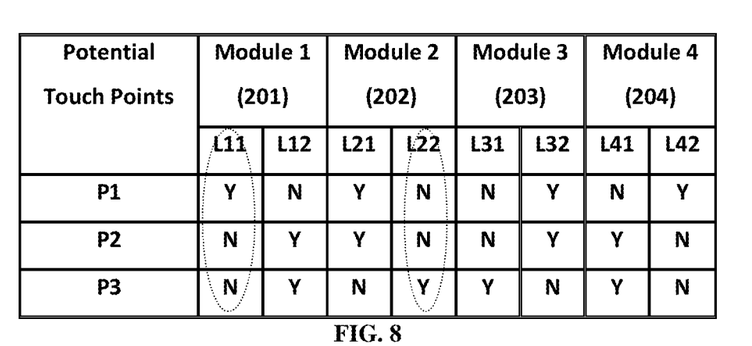
FIG. 8 is another table showing the results from FIG. 7 for occlusion checking.
Figure 9:
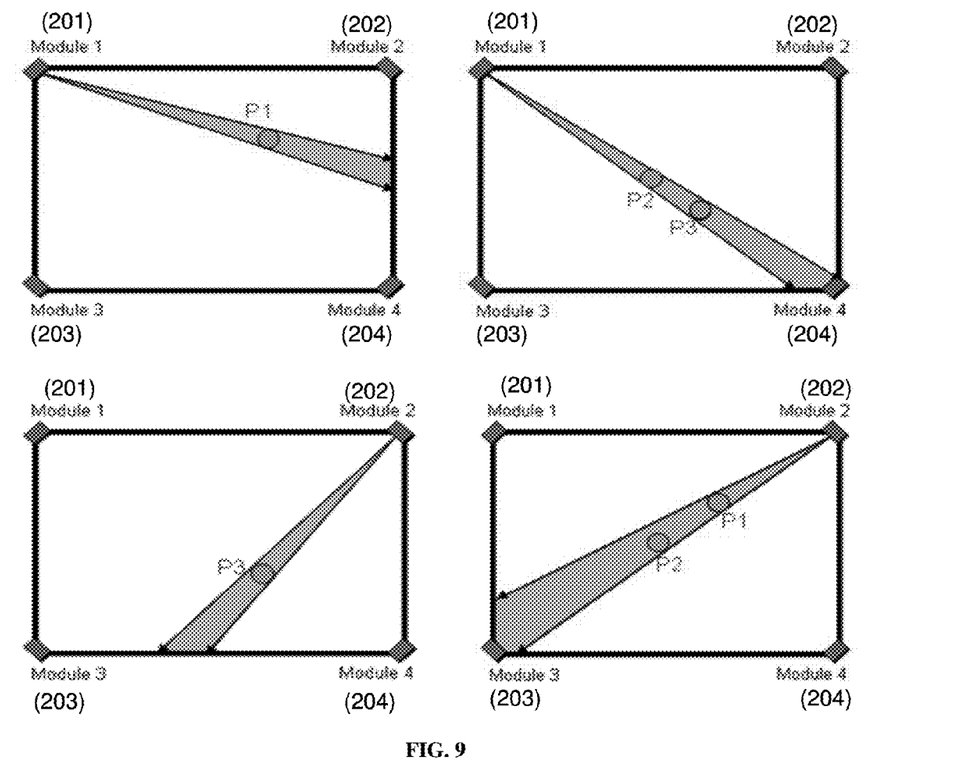
FIG. 9 is a schematic diagram illustrating determination of true touch points by occlusion checking with the result from FIG. 8.

The above results are further tabulated in another table shown in FIG. 8 for performing occlusion checking. The first column of the table represents the potential touch points. The first row of the table represents the optical sensing modules, further with their corresponding detected shadow regions shown in the second row. A matrix is then formed in following columns of the table. Y represents a corresponding potential touch point within a corresponding shadow region. N represents a corresponding potential touch point not within a corresponding shadow region. For example, for L11 from the module 1 (201), only P1 is found within L11 while both P2 and P3 are not found. For L22 from the module 2 (202), both P1 and P2 are not found within L22 while P3 is found. According to the principle of occlusion checking, if there is only one potential touch point is found in any shadow region, such potential touch point is determined as a true touch point. As shown in the FIG. 9, P1 and P3 are determined as true touch points because they are sole on their corresponding shadow regions. P2 is considered as a ghost point since it has never been found as a sole point in any shadow region. After the implementation of occlusion checking, true touch points can be effectively found in such fast and reliable way.

Figure 9A:
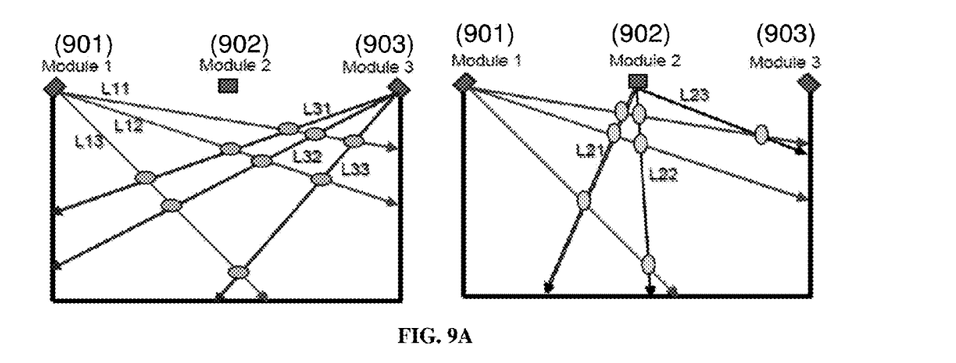
FIG. 9A is a schematic diagram showing a first group and second group of possible touch regions according to another embodiment of the presently claimed invention.
Figure 9B:
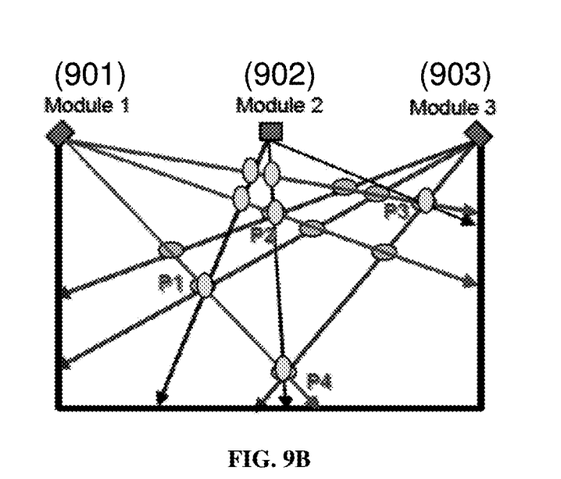
FIG. 9B is a schematic diagram showing four potential touch points from the results of FIG. 9A.
Figure 9C:
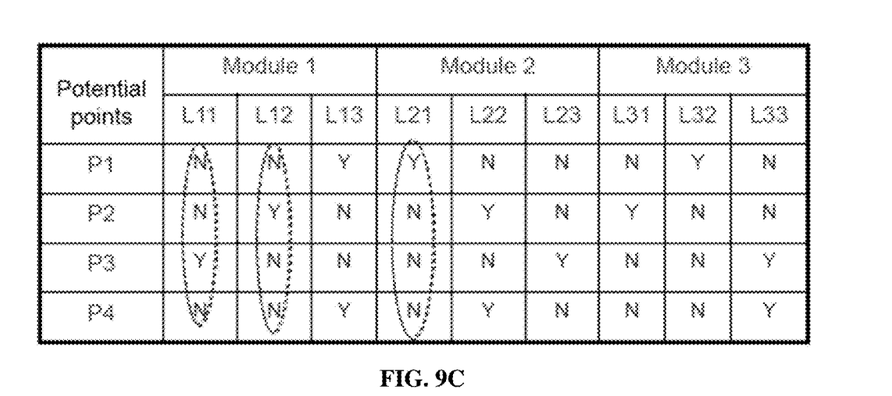
FIG. 9C is a table showing the results form FIG. 9B for occlusion checking.

FIG. 9A-C shows an occlusion checking according to another embodiment of the presently claimed invention. There are three sensing modules, located on the same edge of a touch sensing area, including module 1 (901), 2 (902), and 3 (903) as shown in FIG. 9A. The three sensing modules employ the same optical sensors. Three touch points are used. The module 1 (901) and 3 (903) form a first sensing module pair for determining a first group of possible touch regions. The module 1 (901) and 2 (902) form a second sensing module pair for determining a second group of possible touch regions. Then, overlap checking between the first group and the second group of possible touch regions is performed, and four potential touch points P1, P2, P3, and P4 are found as shown in FIG. 9B. Similar to FIG. 8, the above results are tabulated in FIG. 9C. From the table, P1, P2, and P3 are found as a sole point in the real shadow regions L21, L12, and L11 respectively. P4 is considered as a ghost point since it is never been found as a sole point in any real shadow regions detected by the three sensing modules.

In summary, the occlusion checking comprises the steps of checking the number of potential touch points along all shadow regions, determining a potential touch point as a true touch point when the potential touch point is a sole point in any shadow region.

The occlusion checking is an optional feature in the presently claimed invention since overlap checking is sufficiently accurate in obtaining true touch points in regard to certain applications.

Figure 10:
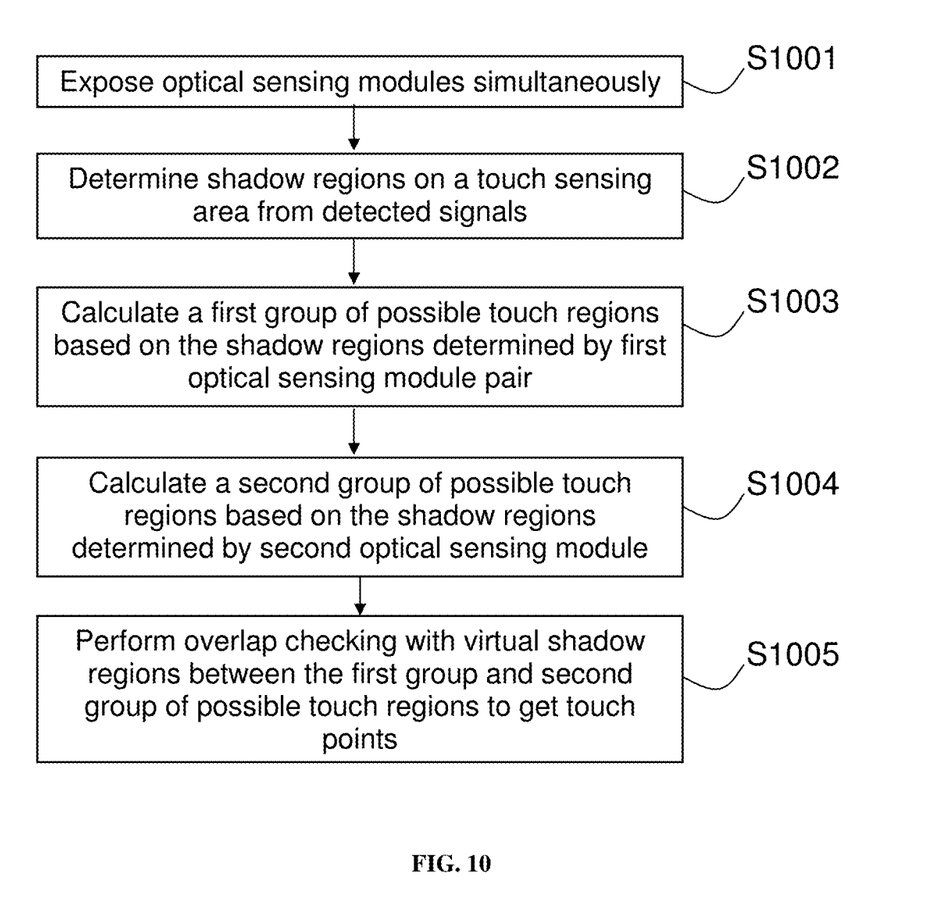
FIG. 10 shows a process flow diagram illustrating the steps of the method for determining true touch points on an input touch panel without occlusion checking according to another embodiment of the presently claimed invention.

FIG. 10 shows a process flow diagram illustrating the steps of the method for determining true touch points on a large size multiple input touch panel using virtual shadow regions without occlusion checking according to another embodiment of the presently claimed invention. In step 1001, all optical sensing modules, located around a touch sensing area, are exposed simultaneously. In step 1002, shadow regions are determined from signals detected by the optical sensing modules. In step 1003, a first group of possible touch regions is calculated through triangulation mapping based on the shadow regions detected by a first optical sensing module pair, selected from the optical sensing modules. In step 1004, a second group of possible touch regions is calculated through triangulation mapping based on the shadow regions detected by a second optical sensing module pair, selected from the optical sensing modules through triangulation mapping. In step 1005, overlap checking with virtual shadow regions is performed to check for overlapping between the first and the second groups of possible touch regions in order to find out touch points.

A second aspect of presently claimed invention is to provide an interactive input system for determining true touch points on a large size multiple input touch panel by implementing optical emitters with different wavelengths, and corresponding light filters for reducing interference effect and eliminating over-exposed signal during signal detection of optical sensing modules.

According to an embodiment of the presently claimed invention, the interactive input system comprises a touch sensing area, at least three optical sensing modules located around the touch sensing area for forming an overlapped sensing zone within the touch sensing area. At least one first optical sensing module, selected form the optical sensing modules, includes a first optical emitter with a first wavelength. At least one second optical sensing module, selected from the optical sensing modules and located at the opposite corner to the first optical sensing module, includes a second optical emitter with a second wavelength. The first and second wavelengths are different. The advantage of using different optical emitters with different wavelengths is for reducing interference effect during signal detection by the optical sensing modules.

Figure 11:
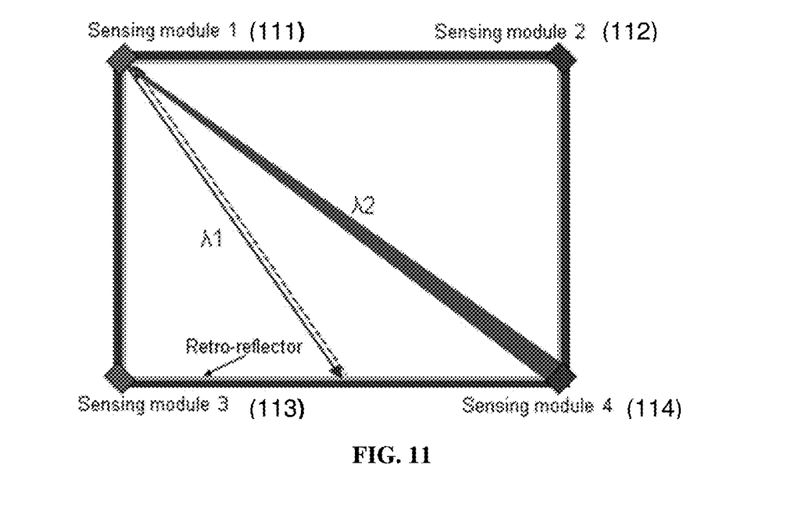
FIG. 11 is a schematic diagram showing an interactive input system for determining true touch points on an input touch panel according to one embodiment of the presently claimed invention.

FIG. 11 shows an interactive input system according to an embodiment of the presently claimed invention. There are four optical sensing modules, indicated as sensing module 1 (111), 2 (112), 3 (113) and 4 (114), which are located at four corners of a touch sensing area respectively. The sensing module 1 (111) is located diagonally opposite to the sensing module 4 (114). The sensing module 2 (112) is located diagonally opposite to the sensing module 3 (113). The touch sensing area is bounded by bezel segments. There is retro-reflector installed on top of the bezels so each optical sensing module is able to detect its corresponding reflected light. The sensing module 1 (111) and 3 (113) include an infra-red light emitting diode (IR LED) light source with peak wavelength $\lambda_1$ while the sensing module 2 (112) and 4 (114) include another IR LED light source with peak wavelength $\lambda_2$. As the wavelength $\lambda_1$ and $\lambda_2$ are different, the sensing module 1 (111) is less likely interfered by the direct light with $\lambda_2$ from the sensing module 4 (114) during its reflected light detection with $\lambda_1$.

In addition, the sensing module 1 (111) and 3 (113) can further include an IR filter with peak transmission at wavelength $\lambda_1$, located in front of their light sensor so that the light with other wavelengths different from $\lambda_1$, especially for the light with $\lambda_2$ come from the sensing module 4 (114) can be filtered out. Ultimately, the over-exposed signal come from the direct light of the sensing module 4 (114) can be eliminated during signal detection of the sensing module 1 (111). Similarly, the sensing module 2 (112) and 4 (114) can further include an IR filter with peak transmission at wavelength $\lambda_2$, located in front of their light sensor because of the same reason.

Preferably, the sensing module 1 (111) and 3 (113) include a retro-reflector located above or below the IR filter to retro-reflect the light with wavelength $\lambda_2$ come from the sensing module 4 (114) and 2 (112) respectively. Under this configuration, the problem of black zone for the sensing module 4 (114) and 2 (112) can be solved since their emitted light, at the positions of the sensing module 1 (111) and 3 (113), can be retro-reflected back towards them for detection. Similarly, the sensing module 2 (112) and 4 (114) also include a retro-reflector located above or below the IR filter to retro-reflect the light with wavelength $\lambda_1$ due to the same reason.

The sensing module 1 (111) and 3 (113) can further include an IR LED light source with peak wavelength $\lambda_2$, while the sensing module 2 (112) and 4 (114) further include another IR LED light source with peak wave-length $\lambda_1$. The two IR LED light sources with two different wavelengths in one sensing module are driven by different current to emit light with different light intensities. For example, in the sensing module 1 (111) and 3 (113), the IR LED light source with wavelength $\lambda_1$ can be driven at a much higher current than the IR LED light source with wavelength $\lambda_2$, because the emitted light by the IR LED light source with wavelength $\lambda_1$ needs to be reflected back by retro-reflective material, and further detected by sensor in the sensing module 1 (111) and 3 (113) respectively, and the emitted light by the IR LED light source with wavelength $\lambda_2$, simply, needs to be directly detected by the sensing module 4 (114) and 2 (112). With this configuration, the problem of black zone for the sensing module 4 (114) and 2 (112) can be eliminated.

The sensing module 1 (111) and 3 (113) can further include a diffusive plate, located in front of the IR LED light sources with peak wavelength $\lambda_2$ for acquiring uniform continuous illumination to be received by the opposite sensing module 4 (114) and 2 (112) respectively. Similarly, the sensing module 4 (114) and 2 (112) can further include a diffusive plate, located in front of the IR LED light sources with peak wavelength $\lambda_1$ due to the same reason.

Figure 12A:
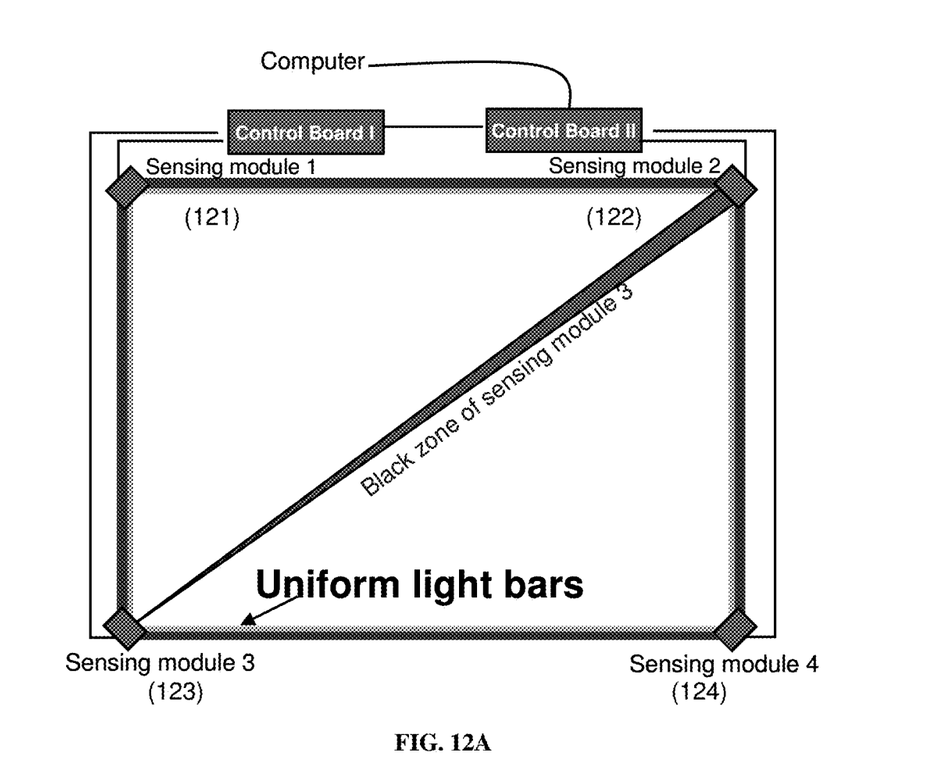
FIG. 12A is a schematic diagram showing an interactive input system for determining true touch points on an input touch panel according to another embodiment of the presently claimed invention.
Figure 12B:
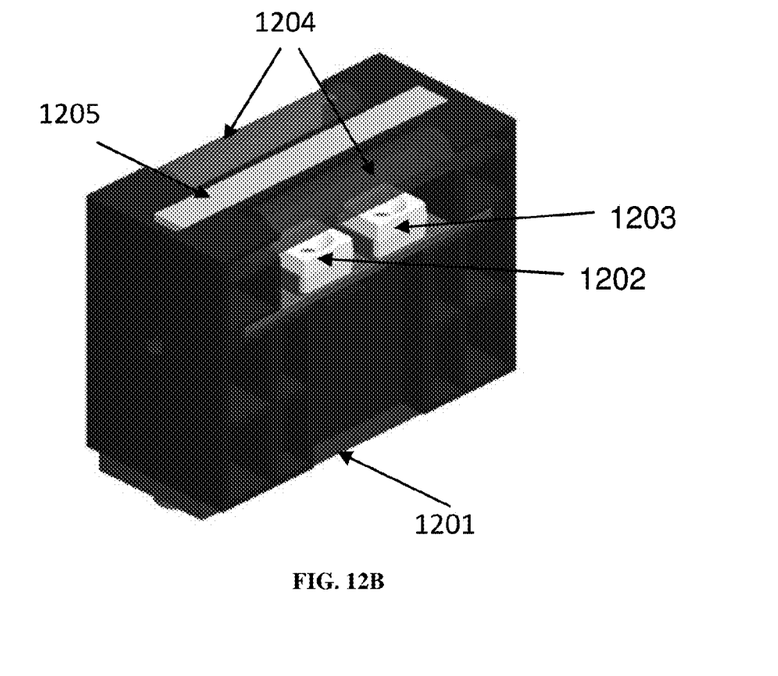
FIG. 12B shows an optical sensing module according to one embodiment of the presently claimed invention.

FIG. 12A shows an interactive input system according to another embodiment of the presently claimed invention. There are four optical sensing modules, indicated as sensing module 1 (121), 2 (122), 3 (123) and 4 (124), which are located at four corners of a touch sensing area, and controlled by two circuit boards respectively. The touch sensing area is bounded by bezel segments. There are uniform light bars, installed on top of the bezels to emit light with a certain wavelength so each optical sensing module is able to detect light emitted from the light bars. Each of the four sensing modules, as shown in FIG. 12B, comprises an image sensor (not shown in the figure), a PCB board 1201, two IR LED light sources 1202 and 1203 (both of the light sources 1202 and 1203 should have the same wavelength) with peak wavelength same as that of the light bars, a diffusive plate 1204 for changing the emitted light profile, and an IR filter 1205 with a peak transmission at wavelength same as that of the light bars. Under this configuration, the problem of black zone is solved as well.

The embodiments disclosed herein may be implemented using general purpose or specialized electro-optical sensors with a general purpose or specialized computing device, computer processor, or electronic circuitry including but not limited to a digital signal processor (DSP), application specific integrated circuit (ASIC), a field programmable gate array (FPGA), and other programmable logic device configured or programmed according to the teachings of the present disclosure. Computer instructions or software codes running in the general purpose or specialized computing device, computer processor, or programmable logic device can readily be prepared by practitioners skilled in the software or electronic art based on the teachings of the present disclosure.

In some embodiments, the present invention includes a computer storage medium having computer instructions or software codes stored therein which can be used to program a computer or microprocessor to perform any of the processes of the present invention. The storage medium can include, but is not limited to, floppy disks, optical discs, Blu-ray Disc, DVD, CD-ROMs, and magneto-optical disks, ROMs, RAMs, flash memory devices, or any type of media or device suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for determining touch points on an interactive input system comprising a touch sensing area and a plurality of optical sensing modules for forming an overlapped sensing zone within the touch sensing area, the method comprising:
    exposing the optical sensing modules located around the touch sensing area for light detection;
    determining real shadow regions of each of the optical sensing modules based on light signals detected by the each of the optical sensing modules, wherein each of the real shadow regions is a real angle range of light physically interrupted by each of the touch points as defined by the detected signal;
    calculating a first group of possible touch regions based on the real shadow regions determined by a first sensing module pair selected from the optical sensing modules through a first triangulation mapping;
    calculating a second group of the possible touch regions based on the real shadow regions determined by a second sensing module pair selected from the optical sensing modules through a second triangulation mapping;
    determining virtual shadow regions of the optical sensing modules of the first sensing module pair by using the second group of the possible touch regions determined by the second optical sensing module pair, wherein each of the virtual shadow regions of the optical sensing module of the first sensing module pair is a virtual angle range of light virtually interrupted by the possible touch regions from a viewing angle of the first sensing module pair;
    determining virtual shadow regions of the optical sensing modules of the second sensing module pair by using the first group of the possible touch regions determined by the first optical sensing module pair, wherein each of the virtual shadow regions of the optical sensing module of the second sensing module pair is a virtual angle range of light virtually interrupted by the possible touch regions from a viewing angle of the second sensing module pair;
    checking overlapping of shadow region between the real shadow region and the virtual shadow region for the each of the optical sensing modules by comparing the real angle range of the real shadow region with the virtual angle range of the virtual shadow region; and
    determining the possible touch region as a potential touch point where the real shadow regions and the virtual shadow regions for all of the optical sensing modules have the overlapping determined as the real angle range of the real shadow region and the virtual angle range of the virtual shadow region being overlapped.

2. The method of claim 1, further comprising a step of acquiring true touch points from the potential touch points by occlusion checking through examining the real shadow regions to check whether the potential touch point is a sole point in any of the real shadow regions.

3. The method of claim 1, further comprising:
    performing occlusion checking to acquire at least one true touch point from the potential touch points.

4. The method of claim 3, wherein the occlusion checking further comprises steps of:
    checking a number of the potential touch point along all of the real shadow regions; and
    determining the potential touch point as a true touch point when the potential touch point is a sole point in any of the real shadow regions.

5. The method of claim 3, wherein four of the optical sensing modules are used, which are located at four corners of the touch sensing area and diagonally opposite to each other.

6. An interactive input system, comprising:
    a touch sensing area; and
    at least three of optical sensing modules forming an overlapped sensing zone within the touch sensing area, wherein each of a first and a second optical sensing module pairs comprises two of the optical sensing modules;
    wherein at least one first optical sensing module, selected from the optical sensing modules, comprises at least one first optical emitter with a first wavelength, and at least one second optical sensing module, selected from the optical sensing modules and located opposite to the first optical sensing module, comprises at least one second optical emitter with a second wavelength; and
    wherein the first wavelength and the second wavelength are different;
    one or more processors configured to execute a method for determining touch points on the touch sensing area according to the method of claim 1.

7. The interactive input system of claim 6, wherein the first optical sensing module further comprises a first optical filter allowing light with the first wavelength to pass through, and the second optical sensing module further comprises a second optical filter allowing light with the second wavelength to pass through.

8. The interactive input system of claim 7, wherein the optical sensing modules further comprises at least one retro-reflector located above or below the optical filters.

9. The interactive input system of claim 6, wherein the optical sensing modules further comprises a diffusive plate located in front of at least one of the optical emitters.

10. The interactive input system of claim 6, wherein the first optical emitter and the second optical emitter are infrared light emitting diodes.

11. The interactive input system of claim 6, the first optical sensing module further comprises at least one second optical emitter with the second wavelength, and the second optical sensing module further comprises at least one second optical emitter with the first wavelength.

12. The interactive input system of claim 11, wherein the first optical emitter and the second optical emitter in the optical sensing modules are driven with different current.

13. The interactive input system of claim 6, wherein the touch sensing area is bounded by bezel segments having retro-reflector or light bars.

14. The interactive input system of claim 13, wherein the light bars emit light with a third wavelength, which is same as the first wavelength or the second wavelength.

15. The interactive input system of claim 6, wherein four of the optical sensing modules are used, which are located at four corners of the touch sensing area and diagonally opposite to each other.

16. The method of claim 1, wherein four of the optical sensing modules are used, which are located at four corners of the touch sensing area and diagonally opposite to each other.

17. A method for determining touch points on an interactive input system comprising a touch sensing area and a plurality of optical sensing modules for forming an overlapped sensing zone within the touch sensing area, the method comprising:

exposing the optical sensing modules located around the touch sensing area for light detection;

determining real shadow regions of each of the optical sensing modules based on light signals detected by the each of the optical sensing modules, wherein each of the real shadow regions is a real angle range of light physically interrupted by each of the touch points as defined by the detected signal;

calculating a first group of possible touch regions based on the real shadow regions determined by a first sensing module pair selected from the optical sensing modules through a first triangulation mapping;

calculating a second group of the possible touch regions based on the real shadow regions determined by a second sensing module pair selected from the optical sensing modules through a second triangulation mapping;

determining virtual shadow regions of the optical sensing modules of the first sensing module pair by using the second group of the possible touch regions determined by the second optical sensing module pair, wherein each of the virtual shadow regions of the optical sensing module of the first sensing module pair is a virtual angle range of light virtually interrupted by the possible touch regions from a viewing angle of the first sensing module pair;

determining virtual shadow regions of the optical sensing modules of the second sensing module pair by using the first group of the possible touch regions determined by the first optical sensing module pair, wherein each of the virtual shadow regions of the optical sensing module of the second sensing module pair is a virtual angle range of light virtually interrupted by the possible touch regions from a viewing angle of the second sensing module pair;

checking overlapping of shadow region between the real shadow region and the virtual shadow region for the each of the optical sensing modules by comparing the real angle range of the real shadow region with the virtual angle range of the virtual shadow region;

determining the possible touch region as a potential touch point where the real shadow regions and the virtual shadow regions for all of the optical sensing modules have the overlapping determined as the real angle range of the real shadow region and the virtual angle range of the virtual shadow region being overlapped;

checking a number of the potential touch point laid on the real shadow region with respect to each of the optical sensing modules; and when the potential touch point is found to be a sole point laid on the real shadow region after checking, determining such potential touch point as a true touch point.

\* \* \* \* \*